(No Model.)
J. D. MORGAN.
AGRICULTURAL MACHINE.
No. 416,179. Patented Dec. 3, 1889.
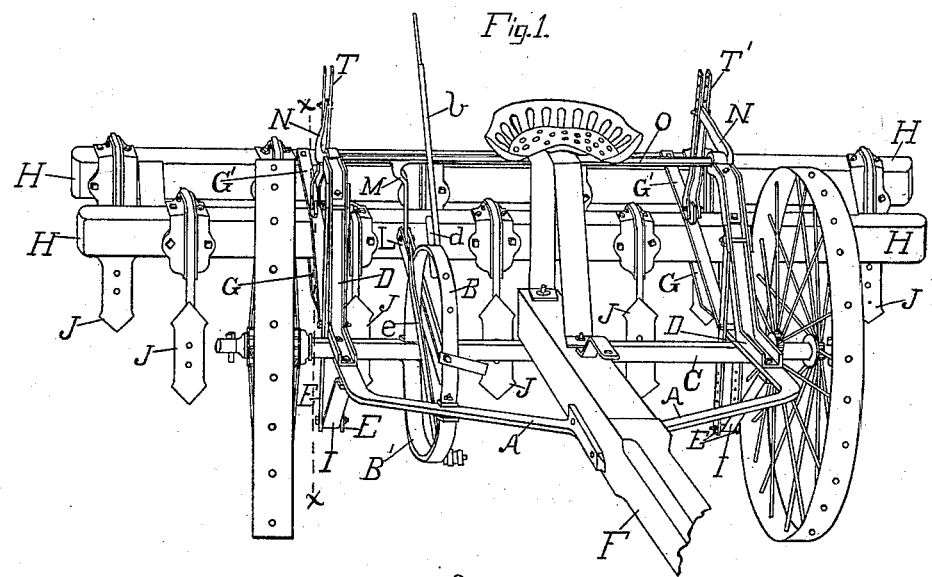
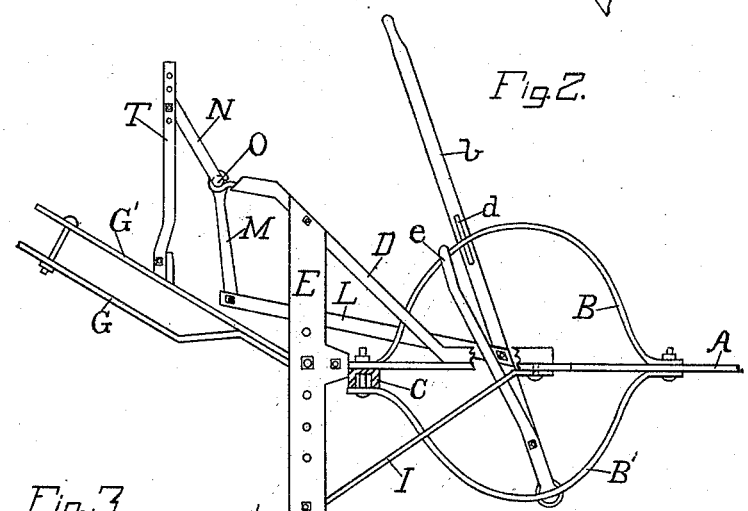
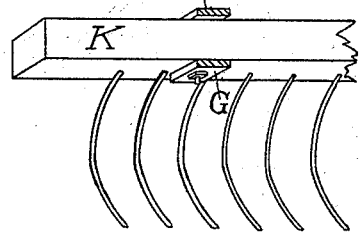
Witnesses
Inventor
Jesse D. Morgan
By his Attorney

UNITED STATES PATENT OFFICE.

JESSEE D. MORGAN, OF VENTURA, CALIFORNIA.

AGRICULTURAL MACHINE.

SPECIFICATION forming part of Letters Patent No. 416,179, dated December 3, 1889.

Application filed May 28, 1889. Serial No. 312,480. (No model.)

*To all whom it may concern:*

Be it known that I, JESSEE D. MORGAN, a citizen of the United States, residing at Ventura, in the county of Ventura and State of California, have invented a new and useful Improvement in Agricultural Machines, of which the following is a full, clear, and exact description, reference being had to the accompanying drawings, and to the letters of reference marked thereon.

Figure 1 of the drawings represents a perspective view of my new machine. Fig. 2 represents a transverse section of the same, taken at line *x x* of Fig. 1. Fig. 3 is a perspective view of the detachable rake.

My invention relates to improvements in metal frames for agricultural machines, by which they can be made cheaper and lighter, and to the combination therewith of changeable parts for different kinds of agricultural work and adjusting mechanism, as hereinafter set forth.

The main frame of my machine is constructed of the curved flat bar A, the channel-bar C, which is the axle to which bar A is bolted, two curved bars B B′, bolted to the bar A and axle C, four upright flat bars E, bolted to the rear ends of the flat bar A in rear of the axle, the braces I, bolted to bar A and to the lower ends of the two pairs of perforated upright bars E, respectively, the inclined channel-bar braces D, bolted at their front ends to the bar A and near their rear projecting ends between the upper ends of upright bars E, respectively, and the tongue F. These channel-bars and flat bars, connected together by bolts and nuts, constitute, with the tongue, which is preferably of wood, a strong, light, and cheap frame, which is so organized as to be readily taken apart and conveniently shipped or transported in compact form.

The supplemental frames are formed of two flat bars G G′, respectively, and are attached by removable bolts between the two upright bars E, respectively, the connection being a hinge by means of which they may be adjusted up or down between said uprights, which are perforated to receive the hinge-bolt, as represented in Fig. 2.

The frames are preferably made of steel, and the tongue and beams H H are of wood. To the latter the cultivator blades or shovels J are bolted. The beams H H are secured between the branches or bars G G′ by bolts and nuts, from which they may be readily removed and the rake-head K can be attached in their stead, and thereby the machine will be converted from a cultivator to a hay-rake.

The mechanism for raising and lowering the supplementary frames with the cultivators or the rake (whichever of these is for the time in use) consists of a rod or roller O, extending across the machine supported adjustably in loops or hinge-connections formed at the upper extended ends of channel-bar braces D. This rod has rigid arms M N, these latter being pivoted between the hinged bars T, connecting it with the supplemental frame G G′, and the arm M is pivoted to the rear end of the connecting-bar L, which at its front end is pivoted to the hand-lever *b*, which in turn is pivoted to the lower curved frame-piece B′. A short blade *d*, secured to lever *b*, works in notches formed in the edge of curved frame-bar B, when the lever *b* is adjusted to different positions in raising frames G G′, with the cultivators or the rake, and the spring-bar *e*, fastened near its end to the lever *b*, presses against the side or edge of bar B, opposite to the lever *b*, and serves to retain the blade *d* in the notch to which it is adjusted in manipulating the hand-lever *b*. The mechanism connected with rod or roller O and the supplementary frames is elevated sufficiently above the main frame and is located at the opposite ends of said rod, as seen at T T″.

From the foregoing description it will be understood that the supplementary frames, to which the cultivator beams and shovels are attached, may be adjusted to a higher or lower position by means of their hinged connection with the uprights E E, a pair of which is attached to the ends of frame-piece A where it extends in rear of axle C; also, that the cultivators may be raised and lowered by means of hand-lever *b*, which is connected to and actuates the rod or roller O, which is attached by hinged connections with said supplementary frames G G′, as heretofore set forth.

Besides the substitution of a rake for the cultivators, broad winged weed-cutters attached to beams may be used in the same position and attached by the same means to the supplementary frames.

Having described my invention, what I claim, and desire to secure by Letters Patent, is—

1. The main frame composed of metal bars A B B', the rear part of the tongue F, channel-steel axle C, and frame-pieces D and E E, rigidly united and supported upon two wheels, in combination with the hinged frames G G', provided with cultivator-blades J, secured to beams H H, in the manner substantially as described.

2. The main frame organized and united by removable bolts and nuts, as described, and connected with hinged supplementary frames formed of two bars, with an open space between them for attaching the beams H H, in combination with the adjusting mechanism consisting of hand-lever $b$ and parts L M N O, pivotally connected together and to the main and supplementary frames, as and for the purpose described.

Witness my hand this 25th day of March, A. D. 1889.

JESSEE D. MORGAN.

Witnesses:
H. P. K. PECK,
A. C. CONNER.